US012682245B2

(12) United States Patent
Clark et al.

(10) Patent No.: US 12,682,245 B2
(45) Date of Patent: Jul. 14, 2026

(54) SYSTEM AND METHOD FOR UTILIZING MODEL PREDICTIVE CONTROL FOR OPTIMAL INTERACTIONS

(71) Applicant: Honda Motor Co., Ltd., Tokyo (JP)

(72) Inventors: Geoffrey Mitchell Clark, Phoenix, AZ (US); Katsu Yamane, Mountain View, CA (US)

(73) Assignee: Honda Motor Co., Ltd., Tokyo (JP)

( * ) Notice: Subject to any disclaimer, the term of this patent is extended or adjusted under 35 U.S.C. 154(b) by 1260 days.

(21) Appl. No.: 17/539,735

(22) Filed: Dec. 1, 2021

(65) Prior Publication Data

US 2023/0050217 A1     Feb. 16, 2023

Related U.S. Application Data

(60) Provisional application No. 63/232,530, filed on Aug. 12, 2021.

(51) Int. Cl.
G06N 3/088      (2023.01)
G06N 3/045      (2023.01)

(52) U.S. Cl.
CPC ............. G06N 3/088 (2013.01); G06N 3/045 (2023.01)

(58) Field of Classification Search
CPC ...... G06N 3/088; G06N 3/045; G06N 3/0442; G06N 3/047; G06N 3/0455; G05B 13/0265; G05B 13/048; B60W 60/001; B60W 50/00; B60W 2050/0022; B60W 2050/0088; B60W 2556/10
USPC .......... 700/245, 48; 701/25, 27, 40, 59, 481; 701/524; 703/4, 93; 706/13, 15, 23, 43
See application file for complete search history.

(56) References Cited

U.S. PATENT DOCUMENTS

| | | | | |
|---|---|---|---|---|
| 2017/0168485 A1* | 6/2017 | Berntorp | ................ | G01C 21/26 |
| 2020/0082248 A1* | 3/2020 | Villegas | ................ | G06N 3/044 |
| 2020/0097808 A1* | 3/2020 | Thomas | ............... | A61B 5/7275 |

(Continued)

FOREIGN PATENT DOCUMENTS

| | | | | |
|---|---|---|---|---|
| GB | 2581808 A | * | 9/2020 | ............. G06V 20/20 |

OTHER PUBLICATIONS

G. Williams et al., "Information theoretic MPC for model-based reinforcement learning," 2017 IEEE International Conference on Robotics and Automation (ICRA), Singapore, 2017, pp. 1714-1721, doi: 10.1109/ICRA.2017.7989202. (Year: 2017).*

(Continued)

*Primary Examiner* — Ellis B. Ramirez
(74) *Attorney, Agent, or Firm* — Rankin, Hill & Clark LLP

(57) ABSTRACT

A system and method for utilizing model predictive control for optimal interactions that include receiving environment e data associated with a surrounding environment of an ego agent and dynamic data associated with an operation of the ego agent. The system and method also include inputting the environment data and the dynamic data to variational auto-encoders. The system and method additionally include utilizing the model predictive control through functional approximation with the variational autoencoders and decoders to output probabilistic action estimates. The system and method further include outputting an estimated optimal control trajectory based on analysis of the probabilistic action estimates to control at least one system of the ego agent to operate within the surrounding environment of the ego agent.

20 Claims, 4 Drawing Sheets

(56) References Cited

U.S. PATENT DOCUMENTS

| | | | | |
|---|---|---|---|---|
| 2020/0363810 A1* | 11/2020 | Arras | ................ | G01C 21/3446 |
| 2021/0049460 A1* | 2/2021 | Ahn | ........................ | G06N 3/047 |
| 2021/0094587 A1* | 4/2021 | Pilly | ................ | B60W 60/0051 |
| 2021/0149404 A1* | 5/2021 | Zeng | ........................ | G01S 17/89 |
| 2021/0276547 A1* | 9/2021 | Narayanan | ........ | B60W 30/0956 |
| 2021/0334630 A1* | 10/2021 | Lambert | ................ | G06N 3/047 |
| 2022/0048187 A1* | 2/2022 | Rudenko | .............. | G05D 1/0221 |
| 2023/0044644 A1* | 2/2023 | Elbaz | ........................ | G06T 15/04 |

OTHER PUBLICATIONS

O. Limoyo, B. Chan, F. Maric, B. Wagstaff, A. R. Mahmood and J. Kelly, "Heteroscedastic Uncertainty for Robust Generative Latent Dynamics," in IEEE Robotics and Automation Letters, vol. 5, No. 4, pp. 6654-6661, Oct. 2020 (Year: 2020).*

K. Cho, T. Ha, G. Lee and S. Oh, "Deep Predictive Autonomous Driving Using Multi-Agent Joint Trajectory Prediction and Traffic Rules," 2019 IEEE/RSJ International Conference on Intelligent Robots and Systems (IROS), Macau, China, 2019, pp. 2076-2081, doi: 10.1109/IROS40897.2019.8967708. (Year: 2019).*

A. Alessio and A. Bemporad, "A survey on explicit model predictive control," in Nonlinear model predictive control. Springer, 2009, pp. 345-369.

H. B. Amor, G. Neumann, S. Kamthe, O. Kroemer, and J. Peters, "Interaction primitives for human-robot cooperation tasks," in 2014 IEEE international conference on robotics and automation (ICRA). IEEE, 2014, pp. 2831-2837.

A. Bemporad, A. Oliveri, T. Poggi, and M. Storace, "Ultra-fast stabilizing model predictive control via canonical piecewise affine approximations," IEEE Transactions on Automatic Control, vol. 56, No. 12, pp. 2883-2897, 2011.

A. Chakrabarty, V. Dinh, M. J. Corless, A. E. Rundell, S. H. Zak, and G. T. Buzzard, "Support vector machine informed explicit nonlinear model predictive control using low-discrepancy sequences," IEEE Transactions on Automatic Control. vol. 62, No. 1, pp. 135-148, 2017.

G. Clark, J. Campbell, and H. B. Amor, "Learning predictive models for ergonomic control of prosthetic devices," arXiv preprint arXiv:2011.07005, 2020.

A. Draeger, S. Engell, and H. Ranke, "Model predictive control using neural networks," IEEE Control Systems Magazine, vol. 15, No. 5, pp. 61-66, 1995.

M. A. Goodrich and A. C. Schultz, Human-robot interaction: a survey. Now Publishers Inc, 2008.

A. Grancharova and T. A. Johansen, "Computation, approximation and stability of explicit feedback min-max nonlinear model predictive control," Automatica, vol. 45, No. 5, pp. 1134-1143, 2009.

M. Hertneck, J. Kohler, S. Trimpe, and F. Allgower, "Learning an approximate model predictive controller with guarantees," IEEE Control Systems Letters, vol. 2, No. 3, pp. 543-548, 2018.

A. Hussein, M. M. Gaber, E. Elyan, and C. Jayne, "Imitation learning: A survey of learning methods," ACM Computing Surveys (CSUR), vol. 50, No. 2, pp. 1-35, 2017.

T. A. Johansen, "Approximate explicit receding horizon control of constrained nonlinear systems," Automatica, vol. 40, No. 2, pp. 293-300, 2004.

T. A. Johansen and A. Grancharova, "Approximate explicit constrained linear model predictive control via orthogonal search tree," IEEE Transactions on Automatic Control, vol. 48, No. 5, pp. 810-815, 2003.

P. A. Lasota, T. Fong, J. A. Shah et al., A survey of methods for safe human-robot interaction. Now Publishers, 2017.

A. Paraschos, C. Daniel, J. Peters, G. Neumann et al., "Probabilistic movement primitives," Advances in neural information processing systems, 2013.

T. Parisini, M. Sanguineti, and R. Zoppoli, "Nonlinear stabilization by receding-horizon neural regulators," International Journal of Control, vol. 70, No. 3, pp. 341-362, 1998.

S. Richter, C. N. Jones, and M. Morari, "Real-time input-constrained mpc using fast gradient methods," in Proceedings of the 48h IEEE Conference on Decision and Control (CDC) held jointly with 2009 28th Chinese Control Conference. IEEE, 2009, pp. 7387-7393.

S. Richter, C. N. Jones, and M. Morari, "Computational complexity certification for real-time mpc with input constraints based on the fast gradient method," IEEE Transactions on Automatic Control, vol. 57, No. 6, pp. 1391-1403, 2011.

S. Schaal, "Dynamic movement primitives—a framework for motor control in humans and humanoid robotics," in Adaptive motion of animals and machines. Springer, 2006, pp. 261-280.

M. Y. Seker, M. Imre, J. H. Piater, and E. Ugur, "Conditional neural movement primitives." in Robotics: Science and Systems, vol. 10, 2019.

Y. Wang and S. Boyd, "Fast model predictive control using online optimization," IEEE Transactions on control systems technology, vol. 18, No. 2, pp. 267-278, 2009.

P. Bakaráč, J. Holaza, M. Kalúz, M. Klaučo, J. Löfberg, and M. Kvasnica, "Explicit mpc based on approximate dynamic programming," in 2018 European Control Conference (ECC), 2018, pp. 1172-1177.

S. Chen, K. Saulnier, N. Atanasov, D. D. Lee, V. Kumar, G. J. Pappas, and M. Morari, "Approximating explicit model predictive control using constrained neural networks," in 2018 Annual American Control Conference (ACC), 2018, pp. 1520-1527.

R. Oberdieck, N. A. Diangelakis, and E. N. Pistikopoulos, "Explicit model predictive control: A connected-graph approach," Automatica, vol. 76, pp. 103-112, 2017.

G. Pin, M. Filippo, F. Pellegrino, G. Fenu, and T. Parisini, "Approximate model predictive control laws for constrained nonlinear discrete-time systems: analysis and offline design," International Journal of Control, vol. 86, No. 5, pp. 804-820, 2013.

* cited by examiner

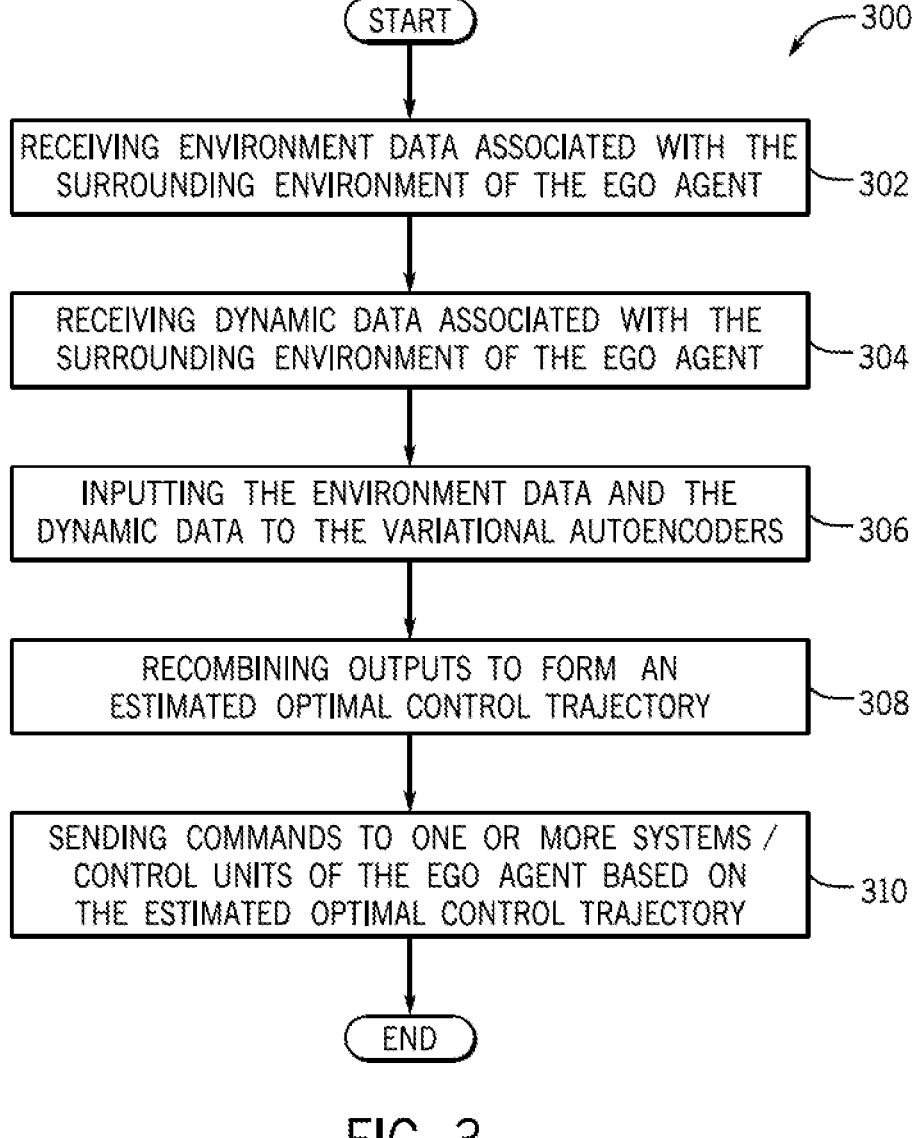

START

300

RECEIVING ENVIRONMENT DATA ASSOCIATED WITH THE SURROUNDING ENVIRONMENT OF THE EGO AGENT — 302

RECEIVING DYNAMIC DATA ASSOCIATED WITH THE SURROUNDING ENVIRONMENT OF THE EGO AGENT — 304

INPUTTING THE ENVIRONMENT DATA AND THE DYNAMIC DATA TO THE VARIATIONAL AUTOENCODERS — 306

RECOMBINING OUTPUTS TO FORM AN ESTIMATED OPTIMAL CONTROL TRAJECTORY — 308

SENDING COMMANDS TO ONE OR MORE SYSTEMS / CONTROL UNITS OF THE EGO AGENT BASED ON THE ESTIMATED OPTIMAL CONTROL TRAJECTORY — 310

END

FIG. 3

SYSTEM AND METHOD FOR UTILIZING MODEL PREDICTIVE CONTROL FOR OPTIMAL INTERACTIONS

CROSS-REFERENCE TO RELATED APPLICATION

This application claims priority to U.S. Provisional Application Ser. No. 63/232,530 filed on Aug. 12, 2021, which is expressly incorporated herein by reference.

BACKGROUND

As agents (e.g., robots, vehicles) generally exist in the real world, to accomplish tasks they may interact with the world around them. Interaction, whether it is with additional agents or the environment may pose notable challenges to robust and effective control. This type of desired control methodology may require an agent to not only react such that the desired outcome is achieved but to do so in a way that optimizes some aspect of the environment. For example, in an object handover task for a robot agent with a human partner, it may not be enough to react to the human partner to deliver a requested tool but to do so in a way which does not put the partner in danger or cause ergonomic harm. A robot in this scenario may continually optimize its trajectory such that the tool is delivered to its partner such that they are not required to stoop or extend beyond their natural reach. Alternately, a robot which interacts with the environment may find it useful to optimize its trajectories to limit power use or torque on the motors therefore extending its battery usage or component lifetimes. This may be useful when applied to particular types of robots which may find it necessary to switch between many optimization strategies based on the terrain and task requirements.

BRIEF DESCRIPTION

According to one aspect, a computer-implemented method for utilizing model predictive control for optimal interactions that includes receiving environment data associated with a surrounding environment of an ego agent and dynamic data associated with an operation of the ego agent. The computer-implemented method also includes inputting the environment data and the dynamic data to variational autoencoders. The computer-implemented method additionally includes utilizing the model predictive control through functional approximation with the variational autoencoders and decoders to output probabilistic action estimates. The computer-implemented method further includes outputting an estimated optimal control trajectory based on analysis of the probabilistic action estimates to control at least one system of the ego agent to operate within the surrounding environment of the ego agent.

According to another aspect, a system for utilizing model predictive control for optimal interactions that includes a memory storing instructions when executed by a processor cause the processor to receive environment data associated with a surrounding environment of an ego agent and dynamic data associated with an operation of the ego agent. The instructions also cause the processor to input the environment data and the dynamic data to variational autoencoders. The instructions additionally cause the processor to utilize the model predictive control through functional approximation with the variational autoencoders and decoders to output probabilistic action estimates. The instructions further cause the processor to output an estimated optimal control trajectory based on analysis of the probabilistic action estimates to control at least one system of the ego agent to operate within the surrounding environment of the ego agent.

According to yet another aspect, a non-transitory computer readable storage medium storing instruction that when executed by a computer, which includes a processor perform a method that includes receiving environment data associated with a surrounding environment of an ego agent and dynamic data associated with an operation of the ego agent. The computer-implemented method also includes inputting the environment data and the dynamic data to variational autoencoders. The computer-implemented method additionally includes utilizing the model predictive control through functional approximation with the variational autoencoders and decoders to output probabilistic action estimates. The computer-implemented method further includes outputting an estimated optimal control trajectory based on analysis of the probabilistic action estimates to control at least one system of the ego agent to operate within the surrounding environment of the ego agent.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

FIG. 3 is a process flow diagram of a method for outputting an estimated optimal control trajectory of an ego agent according to an exemplary embodiment of the present disclosure.

DETAILED DESCRIPTION

Figure 1:
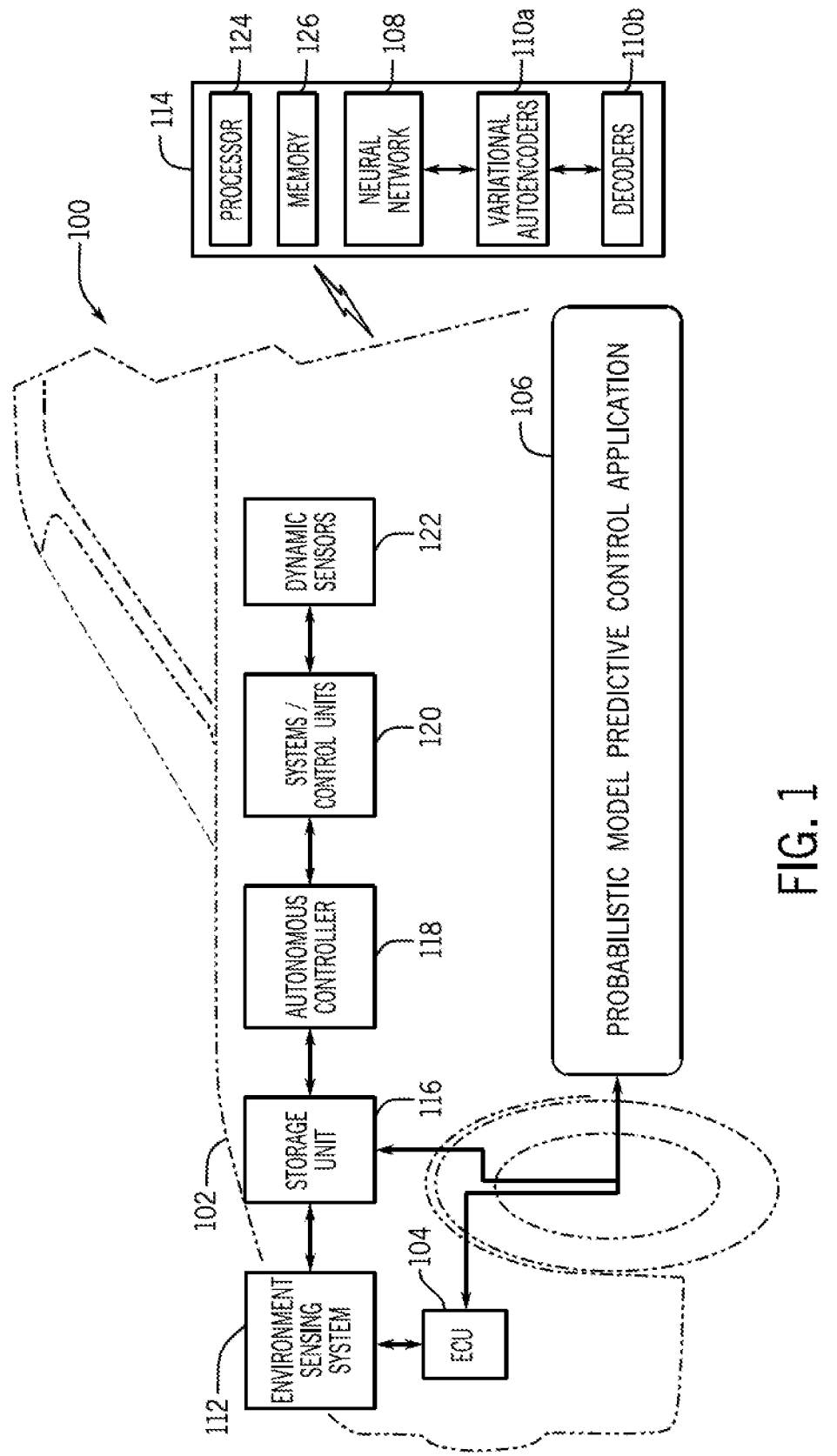
FIG. 1 is a schematic view of an exemplary system for utilizing model predictive control for optimal interactions according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus can also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DR-RAM). The memory can store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discreet logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for utilizing model predictive control for optimal interactions according to an exemplary embodiment of the present disclosure. The components of the system 100, as well as the components of other systems, hardware architectures, and software architectures discussed herein, may be combined, omitted, or organized into different architectures for various embodiments.

Generally, the system 100 includes an ego agent 102 that includes an electronic control unit (ECU) 104 that executes one or more applications, operating systems, agent system and subsystem user interfaces, among others. The ECU 104 may also execute a probabilistic model predictive control application (MPC application) 106 that maybe configured to utilize a neural network 108 to analyze a data associated with a surrounding environment of the ego agent 102 and dynamics associated with an operation of the ego agent 102 using model predictive control (MPC) to provide optimal control values starting at a current state and projecting forward to a time horizon.

The ego agent 102 may include, but may not be limited to, a vehicle, a robot (e.g., wheeled robot, legged robot), a motorcycle, a motorized bicycle/scooter, a construction vehicle, an aircraft, and the like that may be traveling within the surrounding environment of the ego agent 102 that may include one or more additional agents. The surrounding environment of the ego agent 102 may include a predetermined vicinity that may surround the ego agent 102 and may include one or more roadways, pathways, taxiways, and the like upon which the ego agent 102 may be traveling in addition to one or more additional agents.

The one or more additional agents may include, but may not be limited to, additional vehicles (e.g., automobiles, trucks, buses), robots, pedestrians, motorcycles, bicycles, scooters, construction/manufacturing vehicles/apparatus (e.g., movable cranes, forklift, bulldozer), aircraft, and the like that may be located within and traveling within the surrounding environment of the ego agent 102. In some configurations, the surrounding environment may also include traffic infrastructure that may include, but may not be limited to, traffic lights (e.g., red, green, yellow), traffic signage (e.g., stop sign, yield sign, crosswalk sign), roadway markings (e.g., crosswalk markings, stop markings, lane merge markings), and/or additional roadway attributes (e.g., walls, construction barrels, traffic cones, guardrails, concrete barriers, and the like).

The MPC application 106 may provide an improvement in a computer and the technology by utilizing the neural network 108 to learn predictive models of complex nonlinear ego agent interactions with an emphasis on learning explicit control strategies which optimize ego agent trajectories in regard to some aspect of the surrounding environment of the ego agent 102 and/or with interactions with one or more additional agents that are located within the surrounding environment. As discussed below, the neural network 108 utilizes variational autoencoders 110 of an encoder network to analyze environment data associated with global constraints of the surrounding environment of the ego agent 102 and dynamic data associated with the dynamic operation of the ego agent 102.

The variational autoencoders 110 may be configured to reduce an environment state associated with global constraints of the surrounding environment of the ego agent as well as specific optimizations through designed cost functions. Multiple decoders 110b of the neural network 108 may output probabilistic action estimates which may be combined to form an approximate MPC solution. The neural network 108 may be configured to place Gaussian assumptions on the parameterized probabilistic outputs. Additional prior distributions with higher order statistical moments may be used as well. The neural network 108 may be configured to output data associated with an outputted expected next action and confidence condition as probabilistic action estimates that are associated with the ego agent 102 at one or more future time steps (t+1, t+2, t+n). The neural network 108 may thereby output an estimated optimal control trajectory that is based on an analysis of the probabilistic action estimates to the MPC application 106.

In an exemplary embodiment, the ego agent 102 may be configured to be controlled based on estimated optimal control trajectory. In other words, data associated with global constraints of the surrounding environment and the agent dynamics associated with the dynamic operation of the ego agent 102 may be utilized to operate the ego agent 102 based on an outputted expected next action and confidence conditioned on the ego agent dynamics and global constraints.

Additionally, optimal actions and confidences that are each conditioned on designated offline cost priors may also be utilized to control the operation of the ego agent 102. Combining the two estimates associated with the expected next action and optimal actions may produce an approximate MPC formulation which provides autonomous control of the ego agent 102 to enable optimal interactions based on future state predictions in a robust and stable manner.

In one embodiment, the MPC application 106 may be configured to provide autonomous control commands that may be utilized to provide agent autonomous controls that may be associated with the ego agent 102. The agent autonomous controls may be based on the estimated optimal control trajectory to autonomously control operation of the ego agent 102 at one or more future time steps to follow the optimal control trajectory to provide optimal interactions with some aspect of the surrounding environment of the ego agent and/or with one or more additional agents that are located within the surrounding environment.

With continued reference to FIG. 1, the ECU 104 may be configured to be operably connected to a plurality of additional components of the ego agent 102, including, but not limited to, an environment sensing system 112, a storage unit 116, an autonomous controller 118, systems/control units 120, and dynamic sensors 122. In one or more embodiments, the ECU 104 may include a microprocessor, one or more application-specific integrated circuit(s) (ASIC), or other similar devices. The ECU 104 may also include internal processing memory, an interface circuit, and bus lines for transferring data, sending commands, and communicating with the plurality of components of the ego agent 102.

The ECU 104 may also include a communication device (not shown) for sending data internally within (e.g., between one or more components) the ego agent 102 and communicating with externally hosted computing systems (e.g., external to the ego agent 102). Generally, the ECU 104 may communicate with the storage unit 116 to execute the one or more applications, operating systems, system and subsystem user interfaces, and the like that are stored within the storage unit 116.

In one embodiment, the ECU 104 may communicate with the autonomous controller 118 to execute autonomous driving commands to operate the ego agent 102 to be fully autonomously operated or semi-autonomously operated in a particular manner. As discussed, the autonomous driving commands may be based on commands provided by the MPC application 106 to provide agent autonomous controls that may be associated with the ego agent 102 to navigate the ego agent 102 within the surrounding environment based on the estimated optimal control trajectory output by the neural network 108 to the MPC application 106. The autonomous driving commands may be based on commands provided by the MPC application 106 to navigate the ego agent 102 within the surrounding environment to autonomously control one or more functions of the ego agent 102 to travel within the surrounding environment to provide optimal interactions with some aspect of the surrounding environment of the ego agent, with one or more additional agents that are located within the surrounding environment.

In one configuration, one or more commands may be provided to one or more systems/control units 120 that include, but are not limited to a motor control unit, an engine control unit, a braking control unit, a transmission control unit, a steering control unit, and the like to control the ego agent 102 to be autonomously operated based on one or more autonomous commands that are output by the MPC application 106 to navigate the ego agent 102 within the surrounding environment of the ego agent 102.

In one or more embodiments, the systems/control units 120 may be operably connected to the dynamic sensors 122 of the ego agent 102. The dynamic sensors 122 may be configured to receive inputs from one or more systems, sub-systems, control systems, and the like. In one embodiment, the dynamic sensors 122 may be included as part of a Controller Area Network (CAN) of the ego agent 102 and may be configured to provide dynamic data to the ECU 104 to be utilized for one or more systems, sub-systems, control systems, and the like. The dynamic sensors 122 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown).

In one configuration, the dynamic sensors 122 may provide dynamic data in the form of one or more values (e.g., numeric levels) that are associated with the real-time dynamic performance of the ego agent 102 as one or more maneuvers are conducted and/or as the ego agent 102 is controlled to be autonomously driven. The dynamic data that is output by the dynamic sensors 122 may be associated with a real time dynamic operation of the ego agent 102 as it is traveling and interacting with additional agents within the surrounding environment of the ego agent 102. As discussed, the dynamic data may be inputted to the neural network 108 to be provided to the variational autoencoders 110a to be analyzed.

With continued reference to FIG. 1, the environment sensing system 112 of the ego agent 102 may include one or more of the cameras (not shown) that may be positioned in one or more directions and at one or more areas to capture one or more images of the surrounding environment of the ego agent 102 (e.g., images of the pathway on which the ego agent 102 is traveling). The one or more cameras of the environment sensing system 112 may be disposed at external front portions of the ego agent 102, including, but not limited to different portions of a front panel, a dashboard, a bumper, front lighting units, fenders, and a windshield. In one embodiment, the one or more cameras may be configured as RGB cameras that may capture RGB bands that are configured to capture rich information about global constraints that pertain to roadway lane markings, roadway/pathway markers, and/or roadway/pathway infrastructure (e.g., guardrails, walls), and the like that encompass the surrounding environment of the ego agent 102.

In other embodiments, the one or more cameras may be configured as stereoscopic cameras that are configured to capture environmental information in the form of three-dimensional images. In one or more configurations, the one or more cameras may be configured to capture one or more first person viewpoint RGB images/videos of the surrounding environment of the ego agent 102 from the perspective of the ego agent 102. In one embodiment, the environment sensing system 112 may be configured to convert one or more RGB images/videos (e.g., sequences of images) into image data that is communicated to the MPC application 106 to be analyzed.

In some embodiments, the environment sensing system 112 of the ego agent 102 may additionally or alternatively include a plurality of LiDAR sensors (not shown). The plurality of LiDAR sensors may be configured as one or more planar sweep lasers that include respective three-dimensional LiDAR sensors that may be configured to oscillate and emit one or more laser beams of ultraviolet, visible, or near infrared light toward the scene of the surrounding environment of the ego agent 102. The plurality of LiDAR sensors may be configured to receive one or more reflected laser waves (e.g., signals) that are reflected off one or more objects such as surrounding vehicles located within the surrounding environment of the ego agent 102. In other words, upon transmitting the one or more laser beams to the surrounding environment of the ego agent 102, the one or more laser beams may be reflected as laser waves by one or more obstacles that include static objects and/or dynamic objects that may be located within the surrounding environment of the ego agent 102 at one or more points in time.

In one embodiment, the environment sensing system 112 may be configured to analyze the reflected laser waves and output respective LiDAR data. The LiDAR data may include LiDAR coordinates that may be associated with the locations, positions, depths, and/or dimensions (e.g., measurements) of one or more traffic agents that may be located within the surrounding environment of the ego agent 102 that is communicated to the MPC application 106 to be analyzed.

In one embodiment, the neural network 108 may be hosted upon an external server 114 that may be owned, operated, and/or managed by an OEM, a third-party administrator, and/or a dataset manager that manages data that is associated with the operation of the MPC application 106. The external server 114 may be operably controlled by a processor 124 that may be configured to execute the MPC application 106. In particular, the processor 124 may be configured to execute one or more applications, operating systems, database, and the like. The processor 124 may also include internal processing memory, an interface circuit, and bus lines for transferring data, sending commands, and communicating with the plurality of components of the external server 114.

In one embodiment, the processor 124 may be operably connected to a memory 126 of the external server 114. Generally, the processor 124 may communicate with the memory 126 to execute the one or more applications, operating systems, and the like that are stored within the memory 126. In one embodiment, the memory 126 may store one or more executable application files that are associated with the MPC application 106.

In an exemplary embodiment, the memory 126 of the external server 114 may be configured to store the neural network 108. The neural network 108 may be configured as a long short-term memory recurrent neural network (LSTM neural network). As an LSTM neural network, the neural network 108 may execute machine learning/deep learning techniques to process and analyze sequences of data points such as image data and/or LiDAR data provided by the environment sensing system 112 of the ego agent 102 and dynamic data provided by the dynamic sensors 122 of the ego agent 102.

In an exemplary embodiment, the neural network 108 may include the variational autoencoders 110a and decoders 110b. In one embodiment, the variational autoencoders 110a may be configured as multi-pronged ensemble of variational autoencoders. Environment data and dynamic data may be input to the variational autoencoders 110a. Each of the autoencoders of the variational autoencoders 110a may model a single optimization process of the MPC, meaning the computational complexity increases linearly with the number of constraints. The variational autoencoders 110a may be configured to reduce an environment state dimension to a latent space.

The decoders 110b may be configured as multiple decoder prongs that are configured to decode data that is output by the variational autoencoders 110a. By conditioning on the latent environment state as well as specific optimizations through designed cost functions, the decoders 110b may be able to produce probabilistic action estimates which may be combined to form an approximate MPC solution.

II. The Probabilistic Model Predictive Control Application and Related Methods

Components of the MPC application 106 will now be described according to an exemplary embodiment and with continued reference to FIG. 1. In an exemplary embodiment, the MPC application 106 may be stored on the storage unit 116 and executed by the ECU 104 of the ego agent 102. In another embodiment, the MPC application 106 may be stored on the memory 126 of the external server 114 and may be accessed by a telematics control unit of the ego agent 102 to be executed by the ECU 104 of the ego agent 102.

Figure 2:
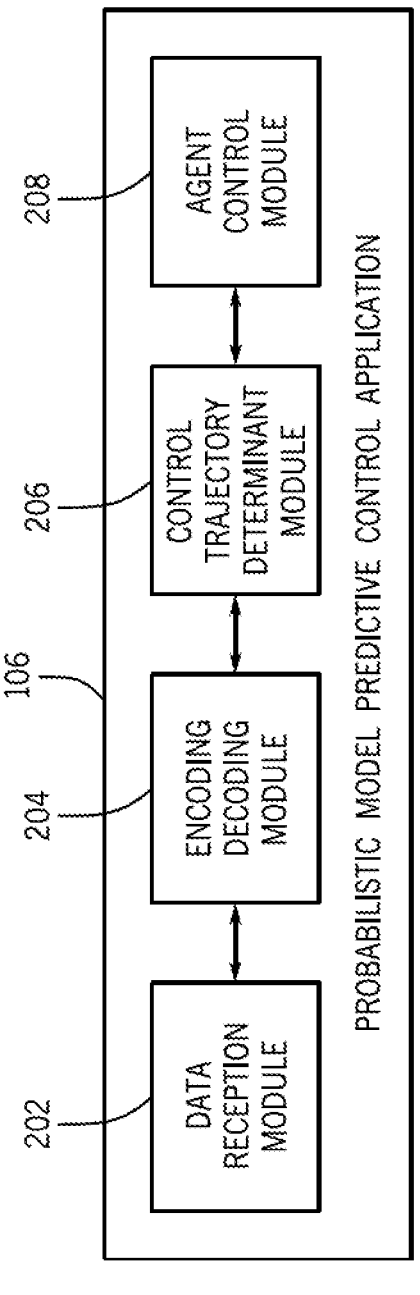
FIG. 2 is a schematic view of an overall structure of an MPC application according to an exemplary embodiment of the present disclosure.

FIG. 2 is a schematic view of an overall structure of the MPC application 106 according to an exemplary embodiment of the present disclosure. A general functionality of the MPC application 106 will now be discussed with respect to FIG. 2. In an exemplary embodiment, the MPC application 106 may include a plurality of modules 202-208 that may be configured to utilizing model predictive control for optimal interactions. The plurality of modules 202-208 may include a data reception module 202, an encoding decoding module 204, a control trajectory determinant module 206, and an agent control module 208. However, it is appreciated that the MPC application 106 may include one or more additional modules and/or sub-modules that are included in lieu of the modules 202-208.

FIG. 3 is a process flow diagram of a method 300 for outputting an estimated optimal control trajectory of the ego agent 102 according to an exemplary embodiment of the present disclosure. FIG. 3 will be described with reference to the components of FIG. 1 and FIG. 2 though it is to be appreciated that the method 300 of FIG. 3 may be used with other systems/components. The method 300 may begin at block 302, wherein the method 300 may include receiving environment data associated with the driving scene of the ego agent 102.

In an exemplary embodiment, at one or more past time steps and/or at a current time step, the data reception module 202 of the MPC application 106 may be configured to communicate with the environment sensing system 112 to collect image data associated with untrimmed images/video of the surrounding environment of the ego agent 102. In some configurations, the image data may pertain to one or more first person viewpoint RGB images/videos of the driving scene of the ego agent 102 captured at particular time steps. The image data may be configured to include rich information about object appearance that pertain to roadway lane markings, roadway/pathway markers, roadway/pathway infrastructure within the driving scene of the ego agent 102 at one or more time steps. In some embodiments, the data reception module 202 may package and store the image data on the storage unit 116 to be evaluated at one or more points in time. In one embodiment, the data reception module 202 may be configured to communicate the image data as environment data to the encoder decoder module 204 of the MPC application 106.

The method 300 may proceed to block 304, wherein the method 300 may include receiving dynamic data associated with the surrounding environment of the ego agent 102. In an exemplary embodiment, the data reception module 202 of the MPC application 106 may be configured to communicate with the dynamic sensors 122 of the ego agent 102. As discussed above, the dynamic sensors 122 may be associated with a real time dynamic operation of the ego agent 102 as it is traveling within the surrounding environment of the ego agent 102. The dynamic data may be provided in the form of one or more values (e.g., numeric levels) that are associated with the real-time dynamic performance of the ego agent 102 as one or more maneuvers are conducted and/or as the ego agent 102 is controlled to be autonomously driven. In some embodiments, the data reception module 202 may package and store the dynamic data on the storage unit 116 to be evaluated at one or more points in time. In one embodiment, the data reception module 202 may be configured to communicate the dynamic data to the encoder decoder module 204 of the MPC application 106.

The method 300 may proceed to block 306, wherein the method 300 may include inputting the environment data and the dynamic data to the variational autoencoders 110*a*. In an exemplary embodiment, the encoder decoder module 204 of the MPC application 106 may be configured to communicate the environment data that is associated with the global constraints of surrounding environment of the ego agent 102 to the neural network 108 to be inputted to the variational autoencoders 110*a*. Additionally, the encoder decoder module 204 may be configured to communicate the dynamic data associated with the dynamic operation of the ego agent 102 to the neural network 108 to be inputted to the variational autoencoders 110*a*.

In one embodiment, each of the autoencoders of the variational autoencoders 110*a* may model a single optimization process of the MPC, meaning the computational complexity increases linearly with the number of constraints. The variational autoencoders 110*a* may be configured to analyze the environment data and the dynamic data and reduce an environment state dimension to a latent space. The variational autoencoders 110*a* may be configured as a multi-pronged variational auto encoders that are conditioned on both the cost of moving from one state to another as well as the costs related to whether each state action pair produces optimal future interactions with respect to the operation of the ego agent 102.

Accordingly, the variational autoencoders 110 may be configured to reduce an environment state as well as specific optimizations through designed cost functions and input respective encoded data to the decoders 110*b* of the neural network 108. The decoders 110*b* of the neural network 108 may decode the encoded data to output probabilistic action estimates which may be combined to form an approximate MPC solution. In an exemplary embodiment, data pertaining to the probabilistic action estimates may be communicated to the encoding decoding module 204 of the MPC application 106. The encoding decoding module 204 may be configured to communicate respective data to the control trajectory determinant module 206 of the MPC application 106.

The method 300 may proceed to block 308, wherein the method 300 may include recombining outputs to form an estimated optimal control trajectory. In an exemplary embodiment, the control trajectory determinant module 206 may be configured to utilize the neural network 108 to place Gaussian assumptions on parameterized probabilistic outputs of the decoders 110*b*. Additional prior distributions with higher order statistical moments may be used as well. In particular, the data pertaining to the probabilistic action estimates output by the decoders 110*b* may be recombined with Gaussian assumptions to form an estimated optimal control trajectory that is associated with the ego agent 102 at one or more future time steps (t+1, t+2, t+n). The control loop is closed in normal MPC fashion by actuating the current control action while iteratively updating based on the sensed environment. The neural network 108 accordingly operates as an approximate MPC controller which may operate on highly nonlinear systems while retaining lower computational complexity and robust closed-loop stability. The neural network 108 may output data pertaining to the estimated optimal control trajectory that is associated with the ego agent 102 at one or more future time steps (t+1, t+2, t+n) to the control trajectory determinant module 206.

More specifically, the neural network 108 utilizes MPC to exploit suboptimal interactions to search a space of surrounding environment of the ego agent 102 for optimality, to learn system dynamics and constraints based on the dynamic data and environment data provided by the ego agent 102, and to learn the relative importance of optimality to one or more interacting agents. The modeling of the MPC by the neural network 108 allows the MPC application 106 to learn the optimal policy:

$$\pi^*:S \to A, \pi(s,a) = p(u_t = a | [x_t, r_t, e_t] = s)$$

which infers an optimal control action A, from the current state S which includes environment variables $e_t$, ego agent motion $x_t$, and reference optimizations $r_t$.

The policy is therefore learned from iterative samples (x,u) of demonstrated, likely stochastic, states and corresponding actions, typically recorded in demonstrations of the form:

$$(x_0, u_0), (x_1, u_1), (x_n, u_n)$$

The neural network 108 may be configured to specifically condition a state on a reference value r. Accordingly, the inference problem may be split apart into two separate inference problems:

$$p(u|x,r) = \frac{p(u|x \cap r)}{p(x \cap r)}, = \frac{p(u|x) \cap p(u|r)}{p(x) \cap p(r)}, = \frac{p(u|x)}{p(x)} \cap \frac{p(u|r)}{p(r)}$$

This formulation of the inference problem is utilized by the neural network 108 because it allows each optimization to be separate, allowing for independent constraints to be applied to each.

With continued reference to FIG. 3, the method 300 may proceed to block 310, wherein the method 300 may include sending commands to one or more systems/control units 120 of the ego agent 102 based on the estimated optimal control trajectory. In an exemplary embodiment, the control trajectory determinant module 206 may communicate data pertaining to the estimated optimal control trajectory that is associated with the ego agent 102 at one or more future time steps (t+1, t+2, t+n) to the agent control module 208 of the MPC application 106.

The agent control module 134 may be configured to analyze the data pertaining to the estimated optimal control trajectory and may communicate one or more commands to the ECU 104, the systems/control units 120 and/or the autonomous controller 118 of the ego agent 102 to provide autonomous control of the ego agent 102 to enable optimal interactions based on future state predictions in a robust and stable manner. In particular, the agent control module 134 may be configured to provide autonomous control commands that may be utilized to provide agent autonomous controls that may be associated with the ego agent 102. The agent autonomous controls may be based on the estimated optimal control trajectory to autonomously control operation of the ego agent 102 at one or more future time steps to follow the optimal control trajectory to provide optimal interactions with some aspect of the surrounding environment of the ego agent, with one or more additional agents that are located within the surrounding environment.

Accordingly, at run-time, the ego agent 102 may be configured to operate based on the observed state of the environment and interaction partners, and using prior knowledge as well as the current observation, the ego agent 102 is operated based on the expected next action and confidence conditioned on system dynamics and global constraints. The optimal actions and confidences are each conditioned on designated offline cost priors. Combining the two estimates produce an approximate MPC formulation which moves toward optimal interactions based on future state predictions in a robust and stable manner.

Figure 4:
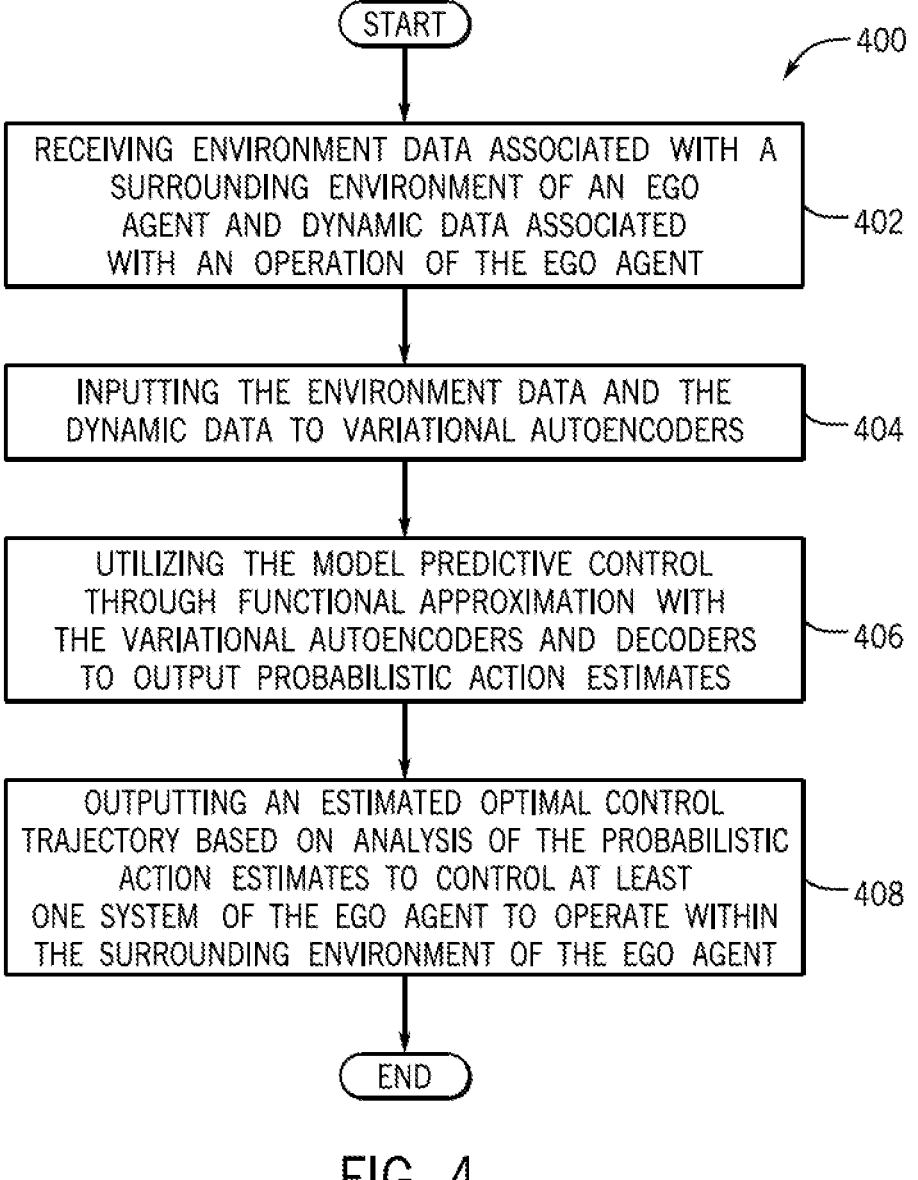
FIG. 4 is a process flow diagram of a method for utilizing model predictive control for optimal interactions according to an exemplary embodiment of the present disclosure.

FIG. 4 is a process flow diagram of a method 400 for utilizing model predictive control for optimal interactions according to an exemplary embodiment of the present disclosure. FIG. 4 will be described with reference to the components of FIG. 1 and FIG. 2 though it is to be appreciated that the method 400 of FIG. 4 may be used with other systems/components. The method 400 may begin at block 402, wherein the method 400 may include receiving environment data associated with a surrounding environment of an ego agent 102 and dynamic data associated with an operation of the ego agent 102.

The method 400 may proceed to block 404, wherein the method 400 may include inputting the environment data and the dynamic data to variational autoencoders 110a. The method 400 may proceed to block 406, wherein the method 400 may include utilizing the model predictive control through functional approximation with the variational autoencoders 110a and decoders 110b to output probabilistic action estimates. The method 400 may proceed to block 408, wherein the method 400 may include outputting an estimated optimal control trajectory based on analysis of the probabilistic action estimates to control at least one system of the ego agent 102 to operate within the surrounding environment of the ego agent 102.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optimal storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The invention claimed is:

1. A computer-implemented method for utilizing model predictive control for optimal interactions comprising:

receiving sensor data from a plurality of vehicle subsystems, including at least one of a LiDAR sensor and a camera;

processing the sensor data to generate environment data associated with a surrounding environment of an ego agent;

receiving dynamic data associated with an operation of the ego agent;

inputting the environment data and the dynamic data to variational autoencoders;

utilizing the model predictive control through functional approximation with the variational autoencoders that output encoded data based on analysis of the environment data and the dynamic data and decoders that decode the encoded data to output parameterized probabilistic action estimates;

outputting an estimated optimal control trajectory based on analysis of the parameterized probabilistic action estimates to control at least one system of the ego agent to operate within the surrounding environment of the ego agent;

generating actuator commands for steering, acceleration, and braking of the ego agent based on the estimated optimal control trajectory;

executing the actuator commands in real-time on the ego agent; and iteratively updating the actuator commands based on the environment data.

2. The computer-implemented method of claim 1, wherein the variational autoencoders are configured as a multi-pronged ensemble of variational autoencoders that are configured to model a single optimization process of the model predictive control.

3. The computer-implemented method of claim 1, further including conditioning the variational autoencoders on a cost of moving from one state to another as well as costs related to where each state action pair produces optimal future interactions.

4. The computer-implemented method of claim 1, wherein the variational autoencoders are configured to reduce an environment state dimension associated with global constraints of the surrounding environment of the ego agent to a latent space.

5. The computer-implemented method of claim 4, wherein the variational autoencoders are configured to reduce the environment state as well as specific optimizations through designed cost functions and input respective encoded data to the decoders.

6. The computer-implemented method of claim 1, wherein utilizing the model predictive control includes recombining outputs of the decoders to form the estimated optimal control trajectory.

7. The computer-implemented method of claim 6, wherein recombining the outputs of the decoder includes recombining data pertaining to the parameterized probabilistic action estimates output by the decoders with Gaussian assumptions to form the estimated optimal control trajectory.

8. The computer-implemented method of claim 1, wherein the model predictive control is utilized to exploit suboptimal interactions to search a space of surrounding environment of the ego agent for optimality, to learn system dynamics and constraints based on the dynamic data and the environment data, and to learn a relative importance of optimality to one or more interacting agents.

9. The computer-implemented method of claim 1, wherein controlling the at least one system of the ego agent includes analyzing data pertaining to the estimated optimal control trajectory and communicating at least one command to an autonomous controller of the ego agent to provide autonomous control of the ego agent to enable optimal interactions based on future state predictions.

10. A system for utilizing model predictive control for optimal interactions comprising:

a memory storing instructions when executed by a processor cause the processor to:

receive sensor data from a plurality of vehicle subsystems, including at least one of a LIDAR sensor and a camera;

process the sensor data to generate environment data associated with a surrounding environment of an ego agent;

receive dynamic data associated with an operation of the ego agent;

input the environment data and the dynamic data to a multi-pronged ensemble of variational autoencoders, wherein each variational autoencoder is conditioned on different cost functions related to state transitions and future interaction optimization;

utilize the model predictive control through functional approximation with the variational autoencoders that output encoded data based on analysis of the environment data and the dynamic data and decoders that decode the encoded data to output parameterized probabilistic action estimates;

recombine outputs of the decoders using Gaussian assumptions to generate a control trajectory prediction based on the parameterized probabilistic action estimate;

output an estimated optimal control trajectory based on analysis of the parameterized probabilistic action estimates to control at least one system of the ego agent to operate within the surrounding environment of the ego agent;

generate actuator commands for steering, acceleration, and braking of the ego agent based on the estimated optimal control trajectory;

execute the actuator commands in real-time on the ego agent; and iteratively update the actuator commands based on the environment data.

11. The system of claim 10, wherein the multi-pronged ensemble of variational autoencoders that are configured to model a single optimization process of the model predictive control.

12. The system of claim 10, wherein the variational autoencoders are conditioned on a cost of moving from one state to another as well as costs related to where each state action pair produces optimal future interactions.

13. The system of claim 10, wherein the variational autoencoders are configured to reduce an environment state dimension associated with global constraints of the surrounding environment of the ego agent to a latent space.

14. The system of claim 13, wherein the variational autoencoders are configured to reduce the environment state as well as specific optimizations through designed cost functions and input respective encoded data to the decoders.

15. The system of claim 10, wherein utilizing the model predictive control includes recombining outputs of the decoders to form the estimated optimal control trajectory.

16. The system of claim 15, wherein recombining the outputs of the decoder includes recombining data pertaining to the parameterized probabilistic action estimates output by the decoders with Gaussian assumptions to form the estimated optimal control trajectory.

17. The system of claim 10, wherein the model predictive control is utilized to exploit suboptimal interactions to search a space of surrounding environment of the ego agent for optimality, to learn system dynamics and constraints based on the dynamic data and environment data, and to learn a relative importance of optimality to one or more interacting agents.

18. The system of claim 10, wherein controlling the at least one system of the ego agent includes analyzing data pertaining to the estimated optimal control trajectory and communicating at least one command to an autonomous controller of the ego agent to provide autonomous control of the ego agent to enable optimal interactions based on future state predictions.

19. A non-transitory computer readable storage medium storing instruction that when executed by a computer, which includes a processor perform a method, the method comprising:

receiving sensor data from a plurality of vehicle subsystems, including at least one of a LiDAR sensor and a camera;

processing the sensor data to generate environment data associated with a surrounding environment of an ego agent;

receiving dynamic data associated with an operation of the ego agent;

inputting the environment data and the dynamic data to variational autoencoders;

utilizing model predictive control through functional approximation with the variational autoencoders that output encoded data based on analysis of the environment data and the dynamic data and decoders that decode the encoded data to output parameterized probabilistic action estimates;

outputting an estimated optimal control trajectory based on analysis of the parameterized probabilistic action estimates to control at least one system of the ego agent to operate within the surrounding environment of the ego agent;

generating actuator commands for steering, acceleration, and braking of the ego agent based on the estimated optimal control trajectory;

executing the actuator commands in real-time on the ego agent; and iteratively updating the actuator commands based on the environment data.

20. The non-transitory computer readable storage medium of claim 19, wherein the model predictive control is utilized to exploit suboptimal interactions to search a space of surrounding environment of the ego agent for optimality, to learn system dynamics and constraints based on the dynamic data and the environment data, and to learn a relative importance of optimality to one or more interacting agents.

* * * * *